Inventors:
James Long
William R. Miller
by David P. Ogle
Their Attorney

May 1, 1962　　　J. LONG ET AL　　　3,032,698
CONTROL NETWORK
Filed May 23, 1958　　　3 Sheets-Sheet 3
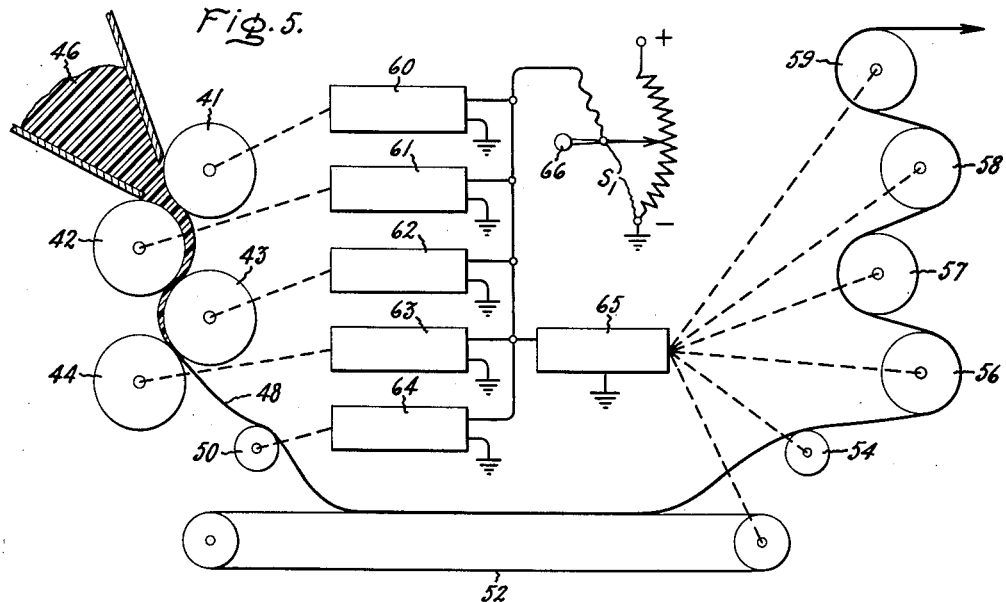
Inventors
James Long
William R. Miller
by David P Ogden
Their Attorney United States Patent Office 3,032,698
Patented May 1, 1962

3,032,698
CONTROL NETWORK
James Long and William R. Miller, Erie, Pa., assignors to General Electric Company, a corporation of New York
Filed May 23, 1958, Ser. No. 737,436
8 Claims. (Cl. 322—19)

Our invention relates to an electrical control network and, more particularly, a control system which will provide an output quantity linearly proportional to an input signal irrespective of inherent variable and nonlinear characteristics in a component of the system.

It is recognized in the machinery and electrical industries that a machine under certain conditions will have a relatively constant relation between various control signals and the output characteristics. Because of this, it is generally a very simple matter to regulate within certain limits any feature such as speed, torque, voltage, etc., of the machine. However, as the machine is loaded to its maximum capacity or run at its maximum speed, the relation between the amplitude of a control signal and the desired output tends to become non-linear. For instance, because of saturation, losses, etc., the output voltage of a generator is a non-linear function of the field current as the output voltage of the generator is increased toward maximum.

In the past, many control circuits and control arrangements have been devised which tend to reduce the effect of non-linear characteristics in an element of the system. However, because of the fact that at least some of these elements when loaded to capacity have inherent non-linear characteristics in relation to some controllable variable, the control arrangements are either costly because of very complicated compensating components or, on the other hand, at least partially inaccurate in that they overcompensate during some portion of the operative range and undercompensate during another portion. This condition can be particularly troublesome in automated production lines where accurate coordination is requisite.

Often, in attempts to accomplish accurate regulation, the critical output characteristics of the machine are sensed and utilized to modify one of the input controls. Such a system is called a loop system. In conventional loop systems, incorporating non-linear elements, the system gain must be set to provide a desired regulation during the lowest gain level operating conditions of the non-linear element in the loop. When this is done, there are other portions of the range where the gain is higher than required to provide specified regulation. Gain greater than necessary tends to produce extraneous stability problems. Moreover, if the characteristics of the non-linear element should drift over a period of time, extra loop gain must be added to hold the output within the specified limits. Because this requirement of a loop gain higher than would otherwise be necessary, larger or higher gain amplifiers are required and the stability problems are further increased.

Accordingly, an object of the invention is to provide an improved control system for maintaining the electrical output quantity applied to a load device from a power-translating device, having a non-linear input signal-output electrical quantity characteristic over at least a portion of its operating range, a linear function of the input signal.

A further object of our invention is to provide an improved electrical control network for driving an electric motor which will linearize a system gain characteristic of a combination of components where a component has a non-linear gain characteristic with respect to an output quantity thereof.

The invention in one form thereof comprises a generator having a regulated variable output voltage. As the voltage of the generator increases sufficiently to cause partial saturation of the generator, or as the current increases to cause load demagnetization effects, the relation between the voltage of the field excitation windings and the generator voltage will tend to distort and thus will not remain linear with respect to the field voltage. A separate amplifying exciter supplies a controlled variable voltage to the field windings of the generator linearly related to a small control signal. This field winding voltage and the output voltage of the generator are compared, and any differential signal between the linear extrapolated output voltage and the non-linear actual generator output is attenuated by a factor equal to the forward gain of the amplifying exciter and combined with the input control signal of the exciter in a sense which will increase the generator field winding voltage proportional to an increase of variable saturation, etc., within the generator. The exciter is selected to be one which will not be saturated by this application and which will have its input and output voltages follow some fixed linear proportional relation for all conditions of operation. By adding the differential signal in a sense which will aid a separate control signal an amount proportional to the variable losses of the generator, we are able to provide an output voltage of the generator which follows a fixed proportional relation to the controlled input signal applied to the exciter.

The subject matter which we regard as our invention is clearly pointed out and distinctly claimed in the concluding portion of this specification. Our invention, however, as to its organization and method of operation together with further objects and advantages thereof will best be understood by reference to the following description taken in connection with the accompanying drawings, in which:

FIG. 5 is a schematic diagram of a plastic calendering machine adapted to utilize our invention.

Figure 1:
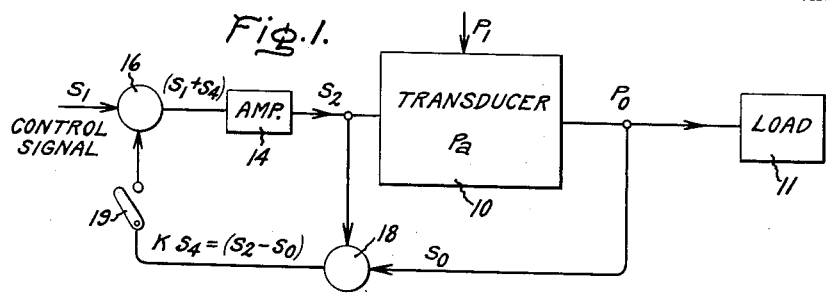
FIG. 1 illustrates a block diagram of the elements of our invention.

Referring now to the drawings, in which like numerals indicate similar parts, in FIG. 1, we have shown a power-translating device or transducer 10 connected to supply a controlled characteristic such as power to a load 11. The power input $P_1$ to the transducer could be in the form of electrical energy or mechanical power and the critical characteristic of the output $P_0$ could be in the form of voltage, or any other measurable variable of which control is desired.

The output $P_0$ of the transducer is controlled directly by an input signal $S_2$. If the transducer 10 is a generator, the signal $S_2$ will be an electric current supplied to the field excitation windings of the transducer 10.

In order to reduce installation costs and obtain efficient utilization of material and equipment, economic considerations dictate selection of a transducer that is the smallest practical size capable for providing the maximum output $P_0$ required to operate the load 11. Under these circumstances, the output $P_0$ is usually not directly proportional to the input signal $S_2$ during at least a portion of the operating range of the transducer 10.

In order to reduce the cost of control equipments, it is the practice of most industries to use small power consumption sensing devices, interpretive devices, etc.

Therefore, the signal $S_2$ is supplied by a linear gain driving element or amplifying device 14. It is requisite to our invention that the driving element or amplifying device 14 be selected to have a fixed linear relation of its ouput signal $S_2$ with respect to a control signal $S_1$ applied thereto. The signal $S_1$ is supplied from an external source, such as a digital computer, punched tape, interpreting machine, or a hand operated device, to control the action of the load 11.

When there is a non-linearity (caused by friction, windage, magnetic saturation, demagnetization, etc., which are referred to generically as losses) in the transducer 10, a differential signal $S_4$ is derived from the comparison of the positive or regenerative feedback signal $S_2$, and a negative or degenerative feedback signal $S_0$. The signal $S_0$ is directly proportional to the output $P_0$. According to one modification of our invention, since the amplifying device 14 will automatically cause signal $S_2$ to be some constant figure such as 50 times larger than the net input signal $(S_1+S_4)$, we have provided an attenuator 16 which will reduce the signal $S_2-S_0$ (50:1) to provide the signal $S_4$ in such a magnitude that it is comparable to and may be combined directly with signal $S_1$. We have thereby provided a loop circuit including the amplifying device 14 which has unity gain. Since the transducer 10 will often amplify the signal $S_2$, a similar attenuator 18 may be provided to make the signal $S_0$ of such a magnitude that it is comparable directly with the signal $S_2$. When utilizing a (50:1) amplifier 14, assuming during linear operating conditions it is desirable to provide an overall system which amplifies the signal $S_1$ by a factor of 200, it is necessary to attenuate the signal of the output $P_0$ (4:1) to obtain an appropriate value of the signal $S_0$. When it is desired to have the system amplify the signal $S_1$ by 400, it is necessary to attenuate the output $P_0$ (8:1). It may thus be seen that the overall gain is the product of the forward gain of amplifier 14 and the attenuation factor of attenuator 18 with respect to signal $P_0$ or otherwise stated the reciprocal product of the gains of attenuators 16 and 18.

Figure 2:
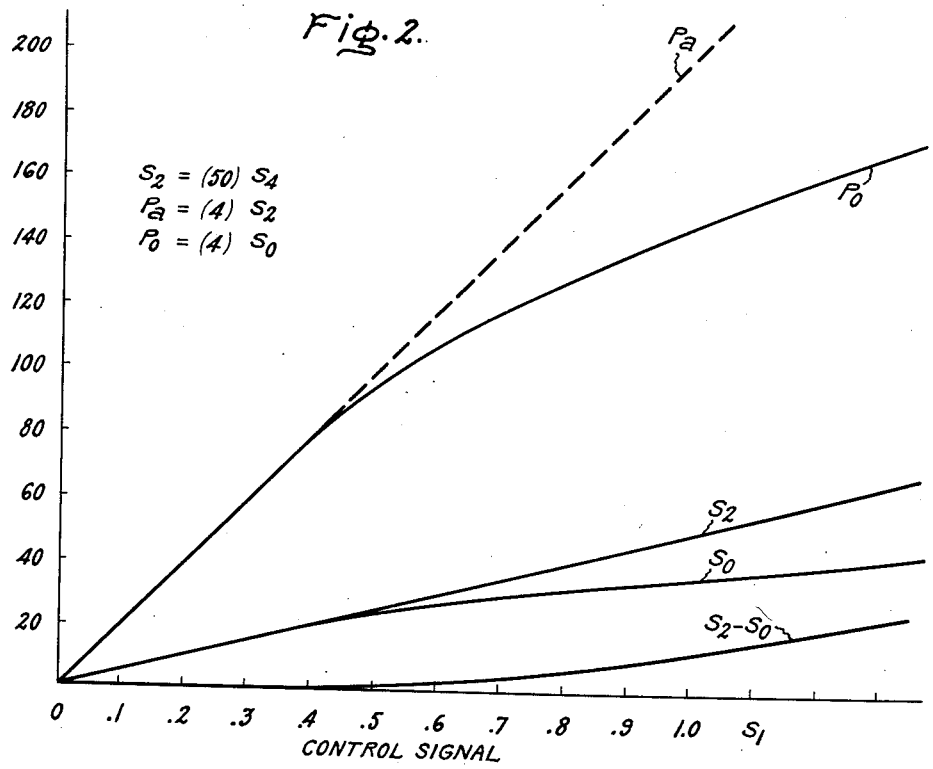
FIG. 2 is a graph illustrating the relationship between the input signal, the output of the linear amplifier and an uncompensated output of the non-linear transducer.

Referring now to FIG. 2, we have disconnected the attenuator 16 by opening a contact switch 19 to show a curve of the relationship of these various quantities $P_0$, $S_0$, $S_1$ and $S_2$ on the axis of the ordinates compared to the signal $S_1$ on the axis of the abscissas. Assuming a power input is sufficient to produce the output $P_0$ desired, the illustrated circuit components are selected to have one unit of $S_1$ (as shown on the abscissa) produce 200 units of apparent output $P_a$. However, because of decreasing gain of the transducer 10 with increasing output $P_0$, the signal $S_1$ will cause the transducer 10 to follow the curved line $OP_0$, the upper portion of which is substantially below the straight line $OP_a$. $OP_a$ is the extrapolated linear output, assuming no variable losses, as the output on the transducer 10 increases to maximum.

Since the amplifying device 14 is selected to have a linear relation between input $S_1$ and output $S_2$, line $OS_2$ is a straight function of $S_1$ and in the particular instance shown, has a slope of 50.

However, the graph shows clearly that the output curve $OP_0$ is not a linear function of the signal $S_1$ or $S_2$ with the switch 19 open. Moreover, it is apparent from FIG. 2 that in the particular case selected for illustration the ratio of $P_a$ to the signal $S_2$ is amplified 4:1 in the transducer itself. Similarly, the signal $S_0$ is proportional to and has a ratio of 1:4 compared to the signal $P_0$. In practice and in FIG. 2, we have attenuated the signal $P_0$ (4:1) to obtain a value of $S_0$ that it may be compared with signal $S_2$ at a 1:1 ratio. Also, in FIG. 2, we have shown a curve of $(S_2-S_0)$ or $50S_4$.

These particular ratios illustrated are arbitrarily selected to show the problems involved. However, they are within the range of those found in electric or other control networks.

Figure 3:
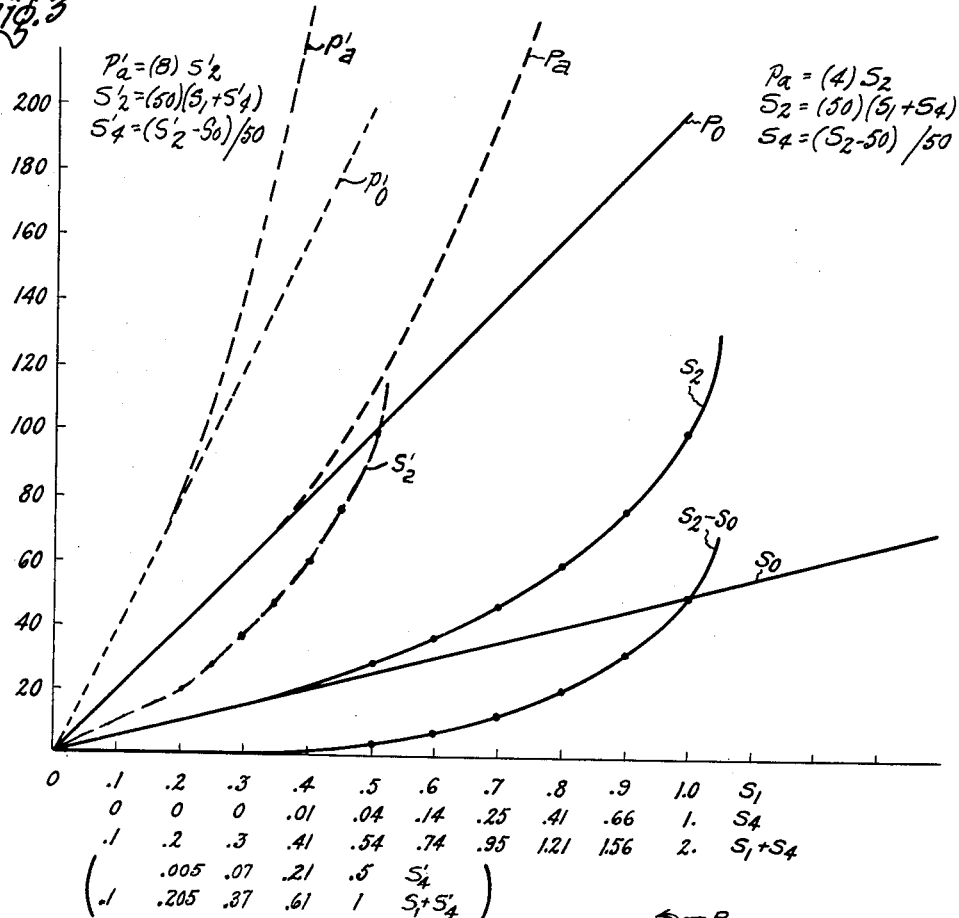
FIG. 3 is a graph illustrating the relationship between the input signal, the output of the amplifier and the output of the transducer with our linearizing control network connected to correct for any variation between the output and an output having a fixed proportional relation to the input signal.

Referring now to FIG. 3 where we have shown a graph according to our invention of the relationship between $S_1$, $S_2$, $S_4$, $P_a$ and $P_0$ with the switch 19 closed. The input $(S_1+S_4)$ is shown in the scale of the abscissa as a non-linear function. In order to facilitate comparison of FIGS. 2 and 3, th signal $S_1$ is (on the scale of the abscissa) a linear function. The output signal $S_2$ of the amplifying device and the output signals ($P_a$, $P_0$ and $S_0$) of the transducer 10 are shown on the scale of the ordinates.

At the point where noticeable saturation commences (.4 per unit $S_1$) a curve for the output signal $S_2$ of the amplifying device departs from the straight line ($OS_0$) because of the additional input signal $S_4$. Thus, $S_2$ is no longer proportional to $S_1$. It is, instead, proportional to $S_1$ plus $S_4$. Since $S_4$ is proportional to the difference between $S_2$ and $S_0$, the addition of this amount to the signal $S_1$ causes the apparent output $P_a$ to increase proportional to the signal $S_2$. However, because of the non-linearity in the transducer 10, which increases with output, the actual output $P_0$ will follow a straight line $OP_0$. Similarly, $OS_0$ will now be a straight line.

Thus, we are able to accomplish a linear function in the output of a non-linear transducer 10 and with a simple control signal we can accomplish accurate voltage regulation, current regulation, etc., while using a machine that is much smaller than could be used in the past. Moreover, we have found that it is practical to increase the usable overload of machines presently being operated without sacrificing the linear regulation between the input signal and the desired output characteristics. When it is desired to control the same transducer 10 and load 11 by a smaller control signal $S_1$, the ratio of the signal $S_1$ compared to the output $P_0$ may be changed from (200:1) to (400:1) to obtain the same linear relationships with the signal $S_1$ equal to one-half the value discussed above. The changes occurring from such a ratio modification are illustrated in FIG. 3 by the phantom lines $OP_a'$, $OP_0'$ and $OS_2'$. Obviously, other changes in amplification in the overall system may be accomplished by simply varying the attenuation within the attenuator 18.

This arrangement in accordance with the invention allows the combination of a greatly simplified control signal producing system and a less expensive transducer (incapable of producing maximum rated output without serious variable loss considerations) because of the linear relation of $S_1$ to $P_0$.

Figure 4:
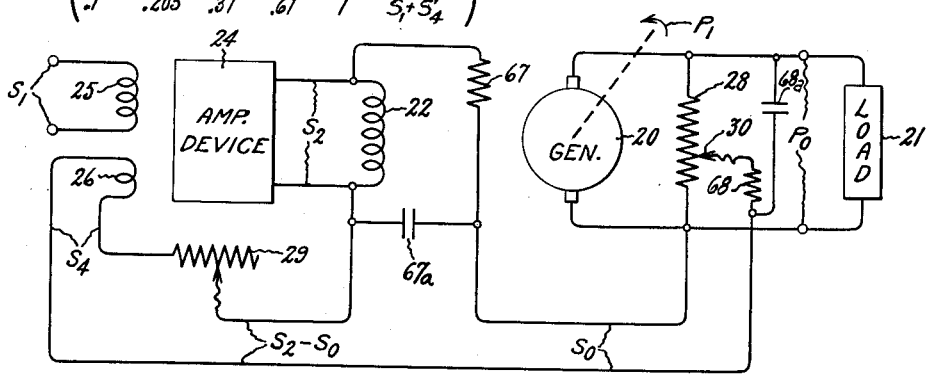
FIG. 4 is a circuit diagram illustrating one method of controlling a generator according to our invention.

One specific embodiment of our invention is shown in the circuit diagram of FIG. 4. This figure is similar functionally to FIG. 1. Power input $P_1$ in the form of a rotating shaft is supplied to a generator 20 to provide a controlled voltage output $P_0$ to a load 21 such as a motor for driving a turret lathe, punch press, runout mill rollers, etc. The voltage output ($P_0$) is controlled by the excitation of a separate field winding 22 of the generator 20 with a separate voltage signal ($S_2$) supplied by an exciter or amplifying device 24. The voltage output signal $S_2$ of the exciter 24 is controlled primarily by a main control field winding 25 which receives a voltage signal $S_1$ from an external source (not shown). The external source either by means of an operator or interpretation equipment will determine what should be happening within the load 21.

Another control field winding 26 is connected functionally to modify the effect of the winding 25 and modify its control of the output of the exciter 24. The winding 26 is connected in circuit electrically with the field winding 22 to sense the voltage $S_2$ and in circuit electrically with a voltage divider 28 to sense the voltage $S_0$.

It should be noted that the potentiometer or voltage divider 28 will operate as an attenuator to reduce $P_0$ (by 4:1) to obtain $S_0$. Thus, $S_4$ is proportional to $S_2-S_0$.

However, the voltage signal $S_4$ is only one-fiftieth as large as $S_2-S_0$. In order to provide a signal $S_4$ that is usable directly to modify the signal $S_1$, it is attenuated (50:1) by the relative number of turns in the windings 25 and 26. Similar attenuation may be accomplished by a voltage divider arrangement (not shown) similar in function to the voltage divider 28.

In some control networks, it may be necessary to adjust the differential voltage $S_2-S_0$ to obtain an effective $S_4$ which will be comparable, in the proper magnitude, with $S_1$. One means of doing this is shown in FIG. 4 as a variable resistor 29 connected in series with the field winding 26.

The features of the invention and some of the advantages thereof may be saliently set forth by a simple mathematical analysis of the motor drive system of FIGURE 4. Let—

$K_{24}$=the gain of amplifier 14
$K_{20}$=gain of generator 20
$K_{30}$=the gain (attenuation factor) of the degenerative feedback circuit as determined by the setting of arm 30.
$K_{29}$=the gain (attenuation factor) of the regenerative feedback circuit as determined by the resistance value of resistor 29.
$K_R$=the gain of amplifier 24 with regenerative feedback
$K_D$=the gain of generator 20 with degenerative feedback
$K$=system gain=$P_0/S_1$ then
$$K = K_R K_D \tag{1}$$

$$K_R = \frac{K_{24}}{1 - K_{24} K_{29}} \tag{2}$$

Equation 2 will be recognized as the well known feedback equation, the minus sign in the denominator indicating positive or regenerative feedback.

$$K_D = \frac{K_{20}}{1 + K_{20} K_{30} K_{29} K_R} \tag{3}$$

$$K = K_R K_D = \frac{K_R K_{20}}{1 + K_{20} K_{30} K_{29} K_R} \tag{4}$$

$$K = \frac{K_{24} K_{20}}{1 - K_{24} K_{29}(1 - K_{20} K_{30})} \tag{5}$$

It may be seen that when $K_{24} = \frac{1}{K_{29}}$ $$K = \frac{K_{24}}{K_{30}} \tag{6}$$

From Equation 6 it will be seen that so long as amplifier 24 is operated within its linear gain characteristic, the system gain K will be linear, independent of non-linearities in the gain characteristic of generator 20, and determinable by the setting of arm 30 on voltage divider 28 or otherwise stated the gain of the degenerative feedback network. The importance of this feature last mentioned becomes more apparent in the following discussion of FIGURE 5.

FIG. 5 is a simplified diagram of a plastic calendering machine comprising a series of coordinated moving parts capable of producing a continuous plastic sheet. A series of heated rollers 41, 42, 43 and 44 is placed adjacent to a plastic mix 46 to soften and compress or compact the supply of plastic into a sheet 48 of plastic material. As the material passes between rollers 41 and 42, a relatively thick sheet is formed. As it passes between rollers 42 and 43, the sheet is made thinner. Similarly, it is again compressed between the rollers 43 and 44. Depending on the physical properties and the relative thickness of the plastic sheet, the speed ratio of the rollers 41—44 must be predetermined. However, with the necessity of using one machine to produce several types of plastic sheet, the predetermined ratio is not fixed and a separate speed control for each component is desirable.

After the rolled plastic sheet passes between the rollers 42 and 43, a stripper roller 50 pulls the sheet 48 from the heated rollers and guides it on to a conveyor 52. From the conveyor, the sheet is lifted by a pick-up roller 54 and proceeds through a series of cooling rollers or drums 56, 57, 58 and 59.

The plastic sheet 48 as it is formed in the heated rollers 41, 42, 43 and 44 is very soft and has a very low yield strength. Hence, it can not be tensioned, for if it is pulled too much, it will be deformed. However, occasionally some controlled tension is desired to produce specific characteristics in the plastic sheet. Thus, the speed and torque of the stripper roller 50 is predetermined by the characteristics desired in the plastic sheet. Similarly, the conveyor 52 must be accurately synchronized with the heated rollers and the stripper roller. After the plastic has passed through the series of cooling drums, its tensile strength and modulus of elasticity are substantially increased whereby synchronous criticalities are reduced.

Often in this type of mechanized plastic sheet producing machines, each of the rollers, conveyor, etc., must have a separately adjustable speed control to produce the desired finished product. Moreover, these machines are usually expected to operate at hundreds or even thousands of feet per minute to produce the amount of plastic sheet required by market demands. Obviously, it would be impractical to adjust the speeds of the various rollers during high speed operation while at the same time attempting to prevent breakage of the plastic sheet and the sticky mess which would result.

With modern mechanized machines of this type, it has been found preferable to provide each heated roller 41—44, the stripper roller 50 and the conveyor 52 with a separate driving motor and each separate motor with a variable speed control in the form of a variable voltage supply system of the type discussed in FIG. 4. Thus, the devices shown as 60—65 represent the control network shown in FIG. 4.

An accepted practice for starting one of these calendering machines is for the operator to adjust the critical relative speed of each roller while the machine is moving at a minimum speed so that the plastic may be threaded between and over the various rollers. This adjustment may be accomplished by predetermining the gain of each of the control systems as by setting the arm 30 of potentiometer 28 to thereby predetermine the gain of each of the control systems 60—65 and hence the speeds of the motors driving the rollers. After the initial adjustments, the operator regulates a master control knob 66 which will increase the speed signal $S_1$ to all control networks 60—65 simultaneously to multiply the speed of each roller an equal amount. The performance of the calendering machine depends on the relative speeds of the various components of the calendering machine being maintained accurately during speed-up so that the plastic sheet is not broken whereby restarting would be required.

With the linearizer according to our invention, all of the variables of the adjustable speed drives, including increases in load, saturation, etc., may be compensated for and substantially eliminated. Thus, when the operator increases the common speed signal ($S_1$), each component of the calendering machine will increase its speed in proportion to the increase in this speed signal $S_1$ while maintaining a proper speed relationship with the other components.

Obviously, other applications of our invention may be envisioned with varying loads in cloth, paper, printing, gluing, etc., as well as constant speed lathes, saws, or cutting tools wherein the critical relationship may depend on the diameter of the piece being machined, and too high or low a speed may cause irreparable damage to the cutting tool or the work surface or various other problems well known in the art.

According to our invention as shown in FIG. 4, it is relatively simple matter to compensate for system resistance voltage drops between the potentiometer or voltage divider 28 and the load 21 as well as compensate for some of the voltage drops in the load, by simply adjusting the voltage tap 30 of the divider 28.

In some applications, it may be desirable to eliminate the effect of transient variations caused by rapid response to the varying signal $S_1$. Moreover, other variable effects which might prove detrimental to rapid and accurate response to the control signal may require compensating components, the details of which will not affect the basic operation of our invention. For instance, a filter circuit such as a resistor 67 and a capacitor 67a may be connected to bypass, around the field winding 22, a substantial portion of any positive transient feedback caused by a lag in voltage build-up of the generator 20 when the signal $S_1$ is increased rapidly and a resistor 68 and a capacitor 68a may be connected across the voltage divider 28 to increase the negative feedback to the winding 26 of the amplifier 24 when there is any substantial transient in the output of the generator 20.

While we have illustrated and described particular embodiments of our invention, other modifications will occur to those skilled in the art. For instance, if it were desirable to control the current output of the generator, the signal $S_0$ could be obtained from a current measuring reactor or shunt resistance connected to provide a signal proportional to the load circuit. We intend, therefore, to cover in the appended claims all such modifications as fall within the true spirit and scope of our invention.

What we claim as new and desire to secure by Letters Patent of the United States is:

1. In combination: a motor for driving a load at a predetermined speed, said motor having a speed of revolution dependent on a voltage applied thereto; a voltage amplifying and regulating network for supplying a voltage to said motor which is linearly related to an input control voltage applied to the network, said network comprising an amplifier operated within its linear gain characteristic and a power translating device having variable non-linear losses over its operating range; means effective to maintain the voltage output of said power translating device linear with respect to the input voltage comprising means for deriving a regenerative feedback voltage from the output of said amplifier, means for deriving a degenerative feedback voltage from said power translating device, means for linearly attenuating said degenerative voltage by a predetermined factor, means for comparing said feedback voltages to derive a differential voltage indicative of deviations in the output voltage of said power translating device from linearity with respect to the input voltage, means for attenuating the differential voltage by a factor equal to the forward gain of said amplifier and applying the attenuated differential voltage to the input of said amplifier to modify the controlling input voltage, whereby the modified input voltage is effective to produce a voltage at said motor linear with respect to the input voltage.

2. In combination: a motor for driving a load at a predetermined speed, said motor having a speed of revolution dependent on a voltage applied thereto; a voltage amplifying and regulating network for supplying a voltage to said motor which is linearly related to an input control voltage applied to the network, said network comprising an amplifier operated within its linear gain characteristic and a power translating device having variable non-linear losses over its operating range; means effective to maintain the voltage output of said power translating device linear with respect to the controlling input voltage comprising a first circuit from the output of said amplifier to the input of said amplifier for supplying regenerative feedback to said amplifier, said first circuit including means for attenuating the regenerative feedback signal by a factor equal to the forward gain of said amplifier whereby the product of the forward gain of said amplifier and the gain of said first circuit equals unity, a second circuit from the output of said translating device to the input of said amplifying device for supplying a degenerative feedback signal to the input of said amplifier, said second circuit including means for attenuating the degenerative signal by a predetermined factor so that the magnitudes of said feedback signals are comparable whereby the differential of said feedback voltages is a measure of any non-linear deviations in the feedback signals and departure of said power translating device output voltage from linearity with respect to the input voltage and whereby the differential signal is effective to modify the effect of the input control voltage on said system to regulate and maintain the voltage applied to said motor circuit linear with respect to the input voltage.

3. A regulating system for supplying an electrical quantity to a load device which quantity is linear with respect to a control input signal, comprising: an amplifier operated within the linear portion of its gain characteristic; a power translating device for supplying the electrical quantity to the load and having a non-linear input signal-output quantity characteristic over a portion of its operating range; means for applying the input signal to said amplifier and means for applying the output signal of said amplifier to said power translating device; first circuit means for supplying a regenerative feedback signal from the output of said amplifier to the input of said amplifier; second circuit means including linear attenuation means for supplying a degenerative feedback signal of magnitude related to the output quantity from the output of said power translating device to the input of said amplifier; said first and second circuit means including means for comparing said feedback signals to derive a differential signal indicative of non-linear deviations of the electrical quantity with respect to the input signal and means for attenuating the differential signal by a factor equal to the forward gain of said amplifier; the attenuated differential signal being combined with the input signal to provide a modified input signal effective to compensate for any non-linear deviations in the output quantity with respect to the input signal to maintain the input signal-output quantity characteristic of said system linear and independent of the gain of said non-linear characteristic device and a function of the attenuation factor of said linear attenuation means.

4. A regulating system for supplying a voltage to a controlled speed motor which voltage is linear with respect to a control input voltage, comprising: an amplifier operated within the linear portion of its gain characteristic; a power translating device for supplying the motor voltage and having a non-linear input signal-output voltage characteristic over a portion of its operating range due predominantly to magnetic saturation; means for applying the input signal to said amplifier and means for applying the output signal of said amplifier to said power translating device; first circuit means for supplying a regenerative feedback signal from the output of said amplifier to the input of said amplifier, second circuit means including linear attenuation means for supplying a degenerative feedback voltage from the output of said power translating device to the input of said amplifier; said first and second circuit means including means for comparing said feedback signals to derive a differential signal indicative of non-linear deviations of the translating device output voltage with respect to the input signal and means for attenuating the differential signal by a factor equal to the forward gain of said amplifier; the attenuated differential signal being combined with the input signal to provide a modified input signal which compensates for any non-linear deviations in the translating device output voltage with respect to the input signal to maintain the input signal-output voltage characteristic of said system linear and independent of the gain of said non-linear characteristic device.

5. A regulating system for supplying a regulated voltage to a controlled speed motor which voltage is linear with respect to a control input signal, comprising: an amplifier operated within the linear portion of its gain characteristic; a generator having a field with an exciting winding thereon separately excited by the output of said amplifier and operated beyond the linear portion of its saturation curve in supplying voltage to said motor; means for applying the input signal to said amplifier, and means for applying the output signal of said amplifier to said generator field winding; first circuit means for sensing the generator field voltage and for supplying a regenerative feedback signal to the input of said amplifier; second circuit means including linear attenuation means for sensing the output voltage of said generator and for supplying a degenerative feedback signal to the input of said amplifier; said first and second circuit means including means for comparing said feedback signals to derive a differential signal indicative of non-linear deviations of the generator voltage with respect to the input signal and means for attenuating the differential signal by a factor equal to the forward gain of said amplifier, the attenuated differential signal being combined with the input signal to provide a modified input signal to said amplifier to compensate for any non-linear deviations in the generator output voltage with respect to the input signal to maintain the voltage gain characteristic of said system linear until said generator field is completely saturated.

6. A regulating system for supplying a regulated voltage to a controlled speed motor which voltage is linear with respect to a control input signal, comprising: an amplifier operated within the linear portion of its gain characteristic; a power translating device for supplying the regulated voltage to the motor and having a non-linear input signal-output voltage characteristic over a portion of its operating range; means for applying the input signal to said amplifier and means for applying the output signal of said amplifier to said power translating device; first circuit means for sensing the output of said amplifier and supplying a regenerative feedback signal to the input of said amplifier; second circuit means including linear attenuation means for sensing the output voltage of said translating device and supplying a degenerative feedback signal to the input of said amplifier; said first and second circuit means including means for comparing said feedback signals to derive a differential signal indicative of non-linear deviations of the output voltage of said power translating device with respect to the input signal and means for attenuating the differential signal by a factor equal to the forward gain of said amplifier; the attenuated differential signal being combined with the input signal to provide a modified input signal to compensate for any non-linear deviations in the translating device output voltage with respect to the input signal to maintain the input signal-output voltage characteristic of said system linear and independent of the gain of said non-linear characteristic device and a function of the attenuation factor of said linear attenuation means, said linear attenuation factor being variable for varying the gain of said system.

7. The regulating system of claim 4 wherein the feedback signals are first attenuated as specified and combined in the input of said amplifier with the input signal.

8. In an arrangement for controlling the speed of strip material driven by rollers where each roller is driven by a motor and the rollers may have different speeds of revolution: an electric motor for driving each roller at a predetermined speed, each of said motors having a predetermined speed-voltage characteristic; means for providing a control signal; a plurality of voltage amplifying and regulating systems for supplying to each motor a driving voltage linear with respect to the control signal, each of said systems comprising an amplifier operated within its linear gain characteristic and receiving the control signal as its input and a power translating device subject to non-linear losses within its operating range receiving the output of said amplifier and supplying a driving voltage to at least one of said motors; first feedback circuit means from the output of said amplifier to the input of said amplifier for providing regenerative feedback thereto; second feedback circuit means from the output of said power translating device to the input of said amplifier for supplying degenerative feedback thereto, said second feedback circuit means including means for attenuating the degenerative signal by a predetermined linear factor; the feedback signals being compared to provide a differential signal indicative of non-linear deviations in the output voltage of said power translating device with respect to the control signal; means for attenuating said differential signal by a factor equal to the forward gain of said amplifier and applying the attenuated differential signal to the input of said amplifier, whereby the overall gain of each of said systems becomes independent of the gain of its power translating device and a function of the value of its first mentioned attenuation means and the speed of each of said motors may be made to have a linear relation with respect to said control voltage determined by the first mentioned attenuation means of the regulating system supplying voltage to said motors.

References Cited in the file of this patent

UNITED STATES PATENTS

| | | |
|---|---|---|
| 2,066,919 | West | Jan. 5, 1937 |
| 2,608,679 | Witzke | Aug. 26, 1952 |
| 2,624,796 | Saunders | Jan. 6, 1953 |
| 2,728,044 | Stearley | Dec. 20, 1955 |
| 2,781,487 | Kennedy | Feb. 12, 1957 |